United States Patent Office 3,274,295
Patented Sept. 20, 1966

3,274,295
BLOCK COPOLYMERS OF VINYLIDENE COMPOUNDS AND PERFLUORINATED NON-VINYL MONOMERS
William P. Baker, Jr., Chadds Ford, Pa., assignor to E. I. du Pont de Nemours and Company, Wilmington, Del., a corporation of Delaware
No Drawing. Filed Oct. 13, 1965, Ser. No. 495,728
10 Claims. (Cl. 260—879)

This application is a continuation-in-part of my copending application Serial No. 195,298 filed May 16, 1962, and allowed May 10, 1965, and now abandoned.

This invention relates to novel polymers and, more particularly, to block copolymers of perfluorinated, non-vinyl monomers with vinyl monomers, preferably with vinyl monomers having conjugated unsaturation, e.g. styrene, butadiene, acrylonitrile and the like.

By "perfluorinated, non-vinyl monomers" are meant perfluorinated compounds having a polymerizable structure but no carbon-to-carbon unsaturation. Such compounds include thiocarbonyl difluoride, tetrafluoroethylene epoxide and tetrafluoroethylene episulfide.

It has been found that by incorporating perfluorinated, non-vinyl monomers into such polymers as polystyrene and the like so that the combination is in the form of a block copolymer, a great number of the properties of the basic polymer can be substantially improved. Thus, where polystyrene is brittle and inflexible, the block copolymer of styrene and the perfluorinated, non-vinyl monomer is tough and flexible. It has also been found that the novel copolymers of the present invention show improved resistance to aromatic and aliphatic solvents and improved resistance to greases. They are more easily cured by conventional curing treatments. Besides greater flexibility and toughness, these polymers display improved tear strengths, impact strengths, greater flame resistance and comparatively low permeability to vapors and gases.

The novel block copolymers are produced by first preparing a catalyst solution; adding the solution to a purified vessel; adding, preferably, if possible, by vacuum distillation, at least one prepurified vinyl monomer under such conditions that cause the vinyl monomer to polymerize; and, thereafter, adding the perfluorinated, non-vinyl monomer under such conditions that cause copolymerization of the perfluorinated, non-vinyl monomer with the polymer of the vinyl monomer, preferably to the extent that the perfluorinated, non-vinyl monomer represents 2–80 mole percent of the sum of moles of vinyl monomer and perfluorinated, non-vinyl monomer in the final copolymer.

VINYL MONOMERS

The preferred group of vinyl monomers for use in the present invention includes styrene, butadiene, isoprene, methyl methacrylate and acrylonitrile. However, the broad group includes esters of acrylic, methacrylic, and other α-substituted acrylic acids, including esters of α-cyanoacrylic acid, acrylonitrile, methacrylonitrile, and other α-substituted acrylonitriles, including vinylidene cyanide, styrene, ring-substituted styrenes, α-methylstyrene, ring-substituted α-methylstyrenes, vinyl pyridines, and methylene malonates.

In general, these monomers should be free of such groups as hydroxy, hydroxycarbonyl, thiol, imino, primary or secondary amino, amido, and the like, i.e. groups that contain an active hydrogen atom, as determined by the Zerewitinoff test[1] carried out under the conditions employed for polymerization. The list of compounds includes, specifically, α-methylstyrene, p-methoxy-α-methylstyrene, p-methyl-α-methylstyrene, styrene, p-methylstyrene, 2, 4-dimethylstyrene, m-ethylstyrene, m-isopropenylstyrene, or butadiene, isoprene, piperylene, or methyl, ethyl, propyl, isopropyl, butyl, isobutyl, sec-butyl, tert-butyl, amyl, 2-ethylhexyl, octyl, capryl, nonyl, 3,5,5-trimethylhexyl, dodecyl, hexadecyl, octadecyl, cyclohexyl, methylcyclohexyl, trimethylcyclohexyl, phenyl, methallyl, crotyl, butenyl, undecenyl, oleyl, methoxyethyl, ethylthioethyl, butoxyethyl, ethoxy-ethoxyethyl, phenoxyethyl, benzoxyethyl, cyclohexoxyethyl, butoxypropyl, ethoxybutyl, terphenyl, phenylethyl, hexahydrobenzyl, tetrahydrobenzyl, tetrahydrofurfuryl, dicyclopentenyl, methacrylate or acrylate, or 2-, 3-, or 4-vinylpyridine, or acrylonitrile, methacrylonitrile, α-phenylacrylonitrile, or dimethyl methylenemalonate, diethyl methylenemalonate, vinylidene cyanide, or methyl, ethyl, or butyl α-cyanoacrylate.

SOLVENTS

Various solvents can be employed for the polymerizations. They include benzene, toluene, xylene, the napthas, ethers, such diethyl ether, diisopropyl ether, dioxane, tetrahydrofurane, the dimethyl ether of ethylene glycol, dimethylformamide and dimethylacetamide. The important considerations in selecting the solvent are: they should be inert; they should have some affinity for the polymer formed; and they should not contain in their structure any active hydrogen atoms as determined by the Zerewitinoff test carried out under the conditions employed for polymerization or other groups which would have a tendency to act as chain terminating or transfer agents. That is, the same criterion regarding active hydrogen applied to the vinyl monomers should be applied to the solvents.

CATALYSTS

The catalyst systems operable in this process are broadly those which promote the formation of dicarbanions. That is, they are capable of transferring an electron to a polymerizable monomer to form a monomer ion, which adds more monomer units and then combines with another ionized monomer radical to yield a molecule having two negatively charged ends or sites (a dicarbanion) on each end of which further propagation can take place. Thus, the metals of Group IA (lithium, sodium, potassium) used either alone or as complexes with such polycyclic aromatic compounds as naphthalene, phenanthrene, diphenyl, dinaphthyl, acenaphthene, methylnaphthalene and retene are especially effective in promoting polymerizations of this type.

The amount of catalyst employed depends primarily on the monomers to be used and the characteristics desired in the final polymer produced. In general, an increased amount of catalyst leads to the production of a lower molecular weight product, and vice versa.

REACTION CONDITIONS

With respect to temperature at which these copolymerizations are carried out, temperatures as low as $-100°$ C. and as high as $100°$ C. may be employed in carrying out the polymerization. Preferably, the reactions are carried out at a temperature of about $-80°$ C. to $+10°$ C. The precise temperature of polymerization will depend to a large degree upon the particular reactivities of the monomers being reacted. Stability of the intermediate carbanion likewise is a consideration in selecting the best temperature for carrying out the reaction. The process is usually carried out under vacuum. For some systems, it may be desired to carry out the polymerizations at atmospheric pressure or above. In some

[1] As described in two articles by Zerewitinoff: Berichte, 40, 2023 (1907), and Berichte, 41, 2233 (1908) ; and in an article by Kohler in J. Am. Chem. Soc., 49, 3181 (1927).

instances an inert atmosphere such as argon may be used to advantage.

PERFLUORINATED, NON-VINYL MONOMER

The perfluorinated, non-vinyl monomer is characterized by thiocarbonyl, epoxide and episulfide linkages. Specifically, the preferred list consists of thiocarbonyl difluoride, tetrafluoroethylene epoxide and tetrafluoroethylene episulfide. The monomer should be used in a very pure condition and should be added to the polymerization system after polymerization of the vinyl monomer has occurred to the extent of at least 10 units. The amount of perfluorinated monomer used should be such that it represents at least 0.5 mole percent of total monomer in the copolymer. Below this amount, it has been found that the advantages of the present invention are not achieved. It should be understood that different minima will apply depending upon the vinyl monomer or vinyl monomers used. Although there is no real maximum, it has been found that when the perfluorinated monomer represents more than 80 mole percent of total monomer used, then the basic desirable properties of the polymer of the vinyl monomer are substantially lost. In some instances wherein properties characteristic of a perfluorinated polymer may be most desired, a higher proportion of the perfluorinated monomer, for example up to 98 mole percent, may be incorporated.

As stated previously, the copolymer of this invention is the block copolymer. Specifically, it is the block copolymer having at least one constituent incorporated singly as a central discrete segment, said constituent being a polymerized vinyl monomer (styrene, methyl methacrylate, acrylonitrile, isoprene, butadiene), said central segment having attached at each end at least one additional polymer segment of a polymerizable monomer devoid of carbon-to-carbon unsaturation (the perfluorinated, non-vinyl monomer). The block copolymers are prepared by the action of an electron transfer agent of the group of metals and metallo-organic complexes of Group IA of the Periodic Table.

It should be understood that the novel copolymers of this invention are useful in the preparation of films, filaments, rods, tubing, moldings, foamed structures, nets, non-woven fabrics and the like.

The films may be used for packaging or as laminates in the preparation of building materials or the like. The copolymers of the invention may be used as such. They may also contain dyes, fillers, pigments, plasticizers, etc.

The invention will be more fully understood by referring to the examples which follow.

Example 1

The apparatus for the polymerization consists of a vacuum train to which is attached the polymerization flask fitted with a glass covered magnetic stirring bar and tubes for admitting the catalyst solution, the solvent and the monomers. The equipment is so arranged that transfers of material to the reaction flask can be made through the closed system, out of contact with the exterior atmosphere. For convenience, the reaction system is operated under reduced pressure so that the liquid materials can be transferred by distillation. The catalyst solution is introduced from a dropping funnel fitted directly to the polymerization flask.

The reaction flask and stirrer are prepared for carrying out polymerization by first heating in an oven at 140° C. overnight, then flaming under evacuation for three hours, then cooling to room temperature under nitrogen and finally attaching to the vacuum line and evacuating. There is then added 2.0 ml. of catalyst solution, about 0.001 molar sodium biphenyl in prepurified tetrahydrofurane. The flask is cooled to —80° C. with a Dry Ice/acetone bath and 300 ml. of tetrahydrofurane is evaporated into it from a blue-green solution of tetrahydrofurane and sodium biphenyl maintained at room temperature. The color of the liquid in the reaction flask at this stage is blue-green (sodium biphenyl) and it shows no loss of intensity on standing, indicating that no catalyst deactivation is occurring. Following this, 9.2 ml. (8.3 grams) of styrene is added by distillation under vacuum over a 15-minute interval while the temperature is held at —80° C.

The styrene had been purified by washing with 10% sodium hydroxide and then with water, then drying over magnesium sulfate, then distilling under nitrogen onto calcium hydride, then degassing under vacuum three times. The styrene so treated is distilled under reduced pressure. A center cut is distilled onto calcium hydride and, prior to use in the polymerization, 10% of this center cut is distilled off and discarded prior to use. Immediately upon the addition of styrene, the solution, which is stirred continuously throughout the experiment by a glass encased magnetic stirrer, turns dark red.

To this solution there is added at a temperature somewhat above —80° C. 4 ml. of thiocarbonyl fluoride prepared from purified tetrafluoro-1,3-dithietane. Immediately upon addition of the thiocarbonyl fluoride, the solution, which is red, becomes colorless. As the reaction proceeds, solid material precipitates from the tetrahydrofuran solvent. When the addition of the thiocarbonyl fluoride is complete (about 15 minutes), the reaction mixture is allowed to stand several minutes after which the polymerization flask is opened under nitrogen and 2 ml. of methanol is added.

The solid material after filtration is dissolved in benzene and a film is cast from the resulting solution. An infrared spectrum of the dried film shows the presence of both styrene and thiocarbonyl fluoride units, with the mole ratio being about 4/1 styrene/thiocarbonyl fluoride. Further extraction of the solid material with benzene shows no change in the infrared spectrum indicating that a true copolymer has been formed.

A film from the block copolymer product is highly flexible; that from a polystyrene control is brittle.

Example 2

Following the procedure described in Example 1, 3.5 ml. of catalyst (0.001 molar sodium biphenyl in tetrahydrofurane) and 300 ml. of tetrahydrofurane are introduced into the polymerization vessel. This mixture is cooled to —80° C. and, with stirring, there is then added 5 ml. of styrene over a 10-minute period followed by addition of 4.7 ml. of purified acrylonitrile over a 3-minute period and 2 ml. of purified thiocarbonyl fluoride over an 80-minute period. Following this, the reaction is terminated by adding 0.25 ml. of glacial acetic acid, the flask is removed from the vacuum line. The cold solution is decanted into 2½ liters of methanol and the resulting precipitate is collected by filtration and dried.

The product is a white powder from which a clear film is pressed at 175° C. The infrared spectrum of the product shows absorption bands characteristic of styrene, acrylinitrile and thiocarbonyl fluoride. Further extraction with benzene does not change the infrared spectrum of the material indicating that a true terpolymer has been obtained. The mole ratio of the moieties in the terpolymer are approximately 7:4:1. Inherent viscosity of the terpolymer is 1.21, measured in a solution of 0.5 g. in 100 ml. of dimethylformamide at 30° C. The film is tough.

Example 3

Following the same procedures previously described, 11.5 ml. of catalyst solution (0.001 molar sodium biphenyl in tetrahydrofurane) and 300 ml. of tetrahydrofurane are placed in the polymerization flask. The mixture is cooled to —80° C. and there is added 7.7 ml. of methyl methacrylate over a 5-minute period. Following this, 5 ml. of thiocarbonyl fluoride is introduced over a 50-minute period. The reaction flask is removed from the vacuum line, opened under a nitrogen atmosphere and 0.25 ml. of glacial acetic acid is added. The reaction product is decanted into methanol and the resulting precipitate is filtered and dried.

A portion of the product is dissolved in acetone and cast into a film. The infrared spectrum of the film shows a molar ratio of methyl methacrylate to thiocarbonyl fluoride of approximately 10/1 in characteristic block occurrence. Clear, tough films are obtained from the block copolymer by pressing a portion at 150° C. at 30 tons pressure. The films show low permeability to vapors of aromatic and aliphatic solvents. The inherent viscosity of the product is 0.64 as measured in a solution of 0.5 g. in 100 ml. benzene at 30° C. A corresponding random copolymer is not easily soluble in ketone solvents and a pressed film thereof is very limp.

*Example 4*

Following the procedure described in Example 1, the polymerization flask is prepared for the reaction. To the polymerization flask there is added 2 ml. of catalyst solution (0.001 molar sodium biphenyl in tetrahydrofurane). The temperature of the polymerization flask is held at −78° C. No deterioration of the catalyst solution is observed after 15 minutes and stirring of the flask contents is begun. There is added to the flask 300 ml. of tetrahydrofurane followed by 7.4 ml. of purified styrene over a period of 12 minutes. The contents of the flask turn a light orange color and become very viscous. Following the addition of the styrene, 2 ml. of tetrafluoroethylene epoxide is admitted.

The tetrafluoroethylene epoxide has previously been prepared for use as follows. The cylinder containing the tetrafluoroethylene epoxide is attached to the vacuum line and the connections are pumped down for ½ hour. Then the amount of tetrafluoroethylene epoxide desired is condensed into a flask on the vacuum line and the flask is cut off from the cylinder by closing a stopcock. The tetrafluoroethylene epoxide is maintained in liquid form in the flask by cooling to −78° C. When portions of tetrafluoroethylene epoxide are desired, the cooling bath is removed from the flask and the tetrafluoroethylene epoxide is allowed to evaporate into the polymerization flask.

Immediately upon the addition of the tetrafluoroethylene epoxide, the reaction mixture changes to a light yellow to almost clear solution. The viscosity does not appear to change very much during the 7 minutes required to add the tetrafluoroethylene epoxide. An additional quantity of 2 ml. of catalyst solution is added to the reaction flask.

The reaction flask is then opened under a nitrogen atmosphere and 0.25 ml. of glacial acetic acid is added. A portion of this solution is cast into a film. Infrared spectra of the cast film showed strong absorption in the 3.3 micron, 8.3 micron and 9.15 micron regions characteristic of the hydrogen atom of aromatic compounds, and compounds with C—F bonds and C—O—C bonds. The films are soluble in benzene. Extraction of the polymer with methanol followed by solution of the polymer in benzene and thereafter casting of films from the benzene solution produces films with spectra essentially the same as from the films described above. The block copolymer films show enhanced flexibility, increased tear strength and increased impact strength over a control film of polystyrene. Inherent viscosity of the polymer in a 0.5% solids solution in benzene at 30° C. was 3.45.

*Example 5*

Following the procedure of Example 1, 5 ml. of catalyst solution (0.001 molar sodium biphenyl in tetrahydrofurane) is introduced to the polymerization flask. No catalyst deterioration is noted after 25 minutes as the reaction flask is maintained at − 78° C. Stirring is begun and 300 ml. of tetrahydrofurane is distilled into the reaction flask. There is then added 7.0 ml. of styrene over a 10-minute interval. The solution becomes viscous and turns orange.

There is then added over a 6-minute period 7 grams of tetrafluoroethylene episulfide. The reaction solution becomes almost colorless with a slight tint of yellow. The viscosity does not appear to change. After 12 minutes, the reaction flask is opened under nitrogen and 1 ml. of the methanol is introduced.

The infrared spectrum of the film cast from the cold tetrahydrofurane solution shows a spectrum indicating that the copolymer is a block copolymer compound mainly polystyrene units with a small amount of tetrafluoroethylene episulfide units. Inherent viscosity determined on this film sample is 1.72 measured as a 0.5% solids solution in benzene at 30° C. Elementary analysis shows fluorine 0.53%. The block copolymer product on pressing into a film shows improved toughness properties such as tear strength and impact strength over a control film made from polystyrene and could be cured readily. Such films are also stiffer than those from a random copolymer.

*Examples 6–7*

These examples are carried out substantially as described in Example 1 using the relative molar amounts of vinyl monomer and perfluorinated monomer shown. The block copolymer products are pressed into films and their properties are given in the table.

| Ex. | Mole Percent Vinyl Monomer | Mole Percent Perfluorinated Monomer | Film Property |
|---|---|---|---|
| 6 | 85 Acrylonitrile | 15 Tetrafluoroethylene episulfide. | Tough, flexible films. |
| 7 | 85 Isoprene | 15 Tetrafluoroethylene epoxide. | Higher tenacity film than isoprene polymer control film. |

The invention claimed is:

1. A normally solid thermoplastic block copolymer having as a non-recurring central segment, a polymer of a monomer selected from the group consisting of conjugated dienes, esters of acrylic and alpha-substituted acrylic acids, ethylenically unsaturated nitriles, vinyl pyridines, methylene malonates and aryl-substituted olefins, said central segment being composed of at least 10 units of said monomer and having attached at each end a polymeric segment of a perfluorinated monomer selected from the group consisting of thiocarbonyl difluoride, tetrafluoroethylene epoxide and tetrafluoroethylene episulfide, said monomer being devoid of groups containing an active hydrogen atom as determined by the Zerewitinoff test, and said perfluorinated monomer constituting 0.5 to 98% of the sum of the moles of said block copolymer.

2. A copolymer as in claim 1 wherein said monomer which forms said central segment polymer is styrene.

3. A copolymer as in claim 1 wherein said monomer which forms said central segment polymer is butadiene.

4. A copolymer as in claim 1 wherein said monomer which forms said central segment polymer is isoprene.

5. A copolymer as in claim 1 wherein said monomer which forms said central segment polymer is methyl methacrylate.

6. A copolymer as in claim 1 wherein said monomer which forms said central segment polymer is acrylonitrile.

7. A copolymer as in claim 1 wherein said perfluorinated monomer is thiocarbonyl difluoride.

8. A copolymer as in claim 1 wherein said perfluorinated monomer is tetrafluoroethylene epoxide.

9. A copolymer as in claim 1 wherein said perfluorinated monomer is tetrafluoroethylene episulfide.

10. A self-supporting film comprising a normally solid thermoplastic block copolymer having as a non-recurring central segment, a polymer of a monomer selected from the group consisting of conjugated dienes, esters of acrylic and alpha-substituted acrylic acids, ethylenically unsaturated nitriles, vinyl pyridines, methylene malonates and aryl-substituted olefins, said central segment being composed of at least 10 units of said monomer and having attached at each end a polymeric segment of a perfluorinated monomer selected from the group consisting of thiocarbonyl difluoride, tetrafluoroethylene epoxide and tetrafluoroethylene episulfide, said monomer being devoid of groups containing an active hydrogen atom as determined by the Zerewitinoff test, and said perfluorinated monomer constituting 0.5 to 98% of the sum of the moles of said block copolymer.

References Cited by the Examiner

UNITED STATES PATENTS

| | | | |
|---|---|---|---|
| 2,177,190 | 4/1965 | Hsieh | 260—881 |
| 3,188,165 | 6/1965 | Magat et al. | 260—879 |

MURRAY TILLMAN, *Primary Examiner.*

G. F. LESMES, *Assistant Examiner.*